(12) United States Patent
Myoung et al.

(10) Patent No.: US 8,957,784 B2
(45) Date of Patent: Feb. 17, 2015

(54) ADVANCED METERING INFRASTRUCTURE SYSTEM FOR GUARANTEEING RELIABLE TRANSMISSION OF METER DATA AND ADVANCED METERING METHOD USING THE SAME

(75) Inventors: No-Gil Myoung, Daejeon (KR); Young-Hyun Kim, Daejeon (KR); Sang-Youm Lee, Daejeon (KR); Byung-Seok Park, Daejeon (KR); In-Ji Choi, Daejeon (KR); Ho-Wook Yang, Seoul (KR)

(73) Assignee: Korea Electric Power Corporation, Seoul (KR)

( * ) Notice: Subject to any disclaimer, the term of this patent is extended or adjusted under 35 U.S.C. 154(b) by 820 days.

(21) Appl. No.: 13/227,085

(22) Filed: Sep. 7, 2011

(65) Prior Publication Data

US 2013/0027219 A1  Jan. 31, 2013

(30) Foreign Application Priority Data

Jul. 29, 2011 (KR) .................. 10-2011-0075810

(51) Int. Cl.
*G08C 15/06* (2006.01)
*G08C 19/20* (2006.01)
*G08C 19/06* (2006.01)
*G08B 23/00* (2006.01)
*G01R 29/00* (2006.01)
*G01R 1/00* (2006.01)
*H04Q 9/00* (2006.01)

(52) U.S. Cl.
CPC ............. *H04Q 9/00* (2013.01); *H04Q 2209/60* (2013.01)
USPC ............ 340/870.03; 340/870.06; 340/870.02; 324/114; 709/211; 709/235

(58) Field of Classification Search
CPC ...... G01D 4/006; Y02B 90/246; Y04S 20/36; Y04S 20/42; H04B 17/0057; H04B 2203/5433; H04B 3/54; H04L 12/2697; H04L 43/0864; H04L 45/127; H04W 36/30; H04W 40/248; H04W 48/12; H04W 8/005
USPC ...................... 340/1.1–16.1, 870.01–870.07; 324/113–116; 709/208–211, 232–235; 375/219–228; 703/23–28
See application file for complete search history.

(56) References Cited

U.S. PATENT DOCUMENTS

2006/0002350 A1* 1/2006 Behroozi ....................... 370/338
2007/0058555 A1* 3/2007 Blair et al. .................... 370/250

(Continued)

*Primary Examiner* — Firmin Backer
*Assistant Examiner* — Jerold Murphy
(74) *Attorney, Agent, or Firm* — McDermott Will & Emery LLP

(57) ABSTRACT

Disclosed herein is an advanced metering infrastructure system that includes electronic meters, each of which being configured to measure and store an amount of energy consumed by each customer and provided with a slave communication modem, a data concentrator for collecting meter data from the electronic meters via a master communication modem that performs wired/wireless communication with the slave communication modems of the electronic meters, and a meter reading server for receiving and managing the meter data collected by the data concentrator. The master communication modem and each of the slave communication modems implement mutual communication interfaces using a protocol stack. The protocol stack includes a network layer, an application layer, and a modem performance analysis layer disposed between the network layer and the application layer and configured to analyze quality of a communication link between the master communication modem and each slave communication modem.

15 Claims, 9 Drawing Sheets

(56) References Cited

U.S. PATENT DOCUMENTS

2007/0229305 A1* 10/2007 Bonicatto et al. ........ 340/870.03
2009/0146838 A1* 6/2009 Katz ........................ 340/870.02
2009/0146839 A1* 6/2009 Reddy et al. ............. 340/870.02
2011/0182326 A1* 7/2011 Picard .......................... 375/132

* cited by examiner

FIG.2

| EXISTING STATE OF COLLECTED METER DATA | · PERIODIC METER READING: METER READING SUCCESS RATE ONCE A DAY · CURRENT METER READING/LP DATA: METER READING SUCCESS RATE EVERY TWO HOURS | | | |
|---|---|---|---|---|
| HEAD OFFICE NAME | TARGET HOUSEHOLD | PERIODIC METER READING | CURRENT METER READING | LP |
| PUSAN | 4,587 | 98.90% | 98.20% | 56.72% |
| CHUNGBUK | 4,459 | 100% | 97.00% | 40.80% |
| INCHEON | 4,569 | 99.30% | 98.50% | 73.65% |
| JEONBUK | 4,049 | 94.00% | 95.10% | 55.37% |
| KANGWON | 4,664 | 99.90% | 98.90% | 45.34% |
| GYEONGBUK | 4,218 | 99.70% | 98.90% | 61.25% |
| GYEONGGI | 4,295 | 99.30% | 98.10% | 55.34% |
| GYEONGNAM | 4,879 | 99.00% | 97.60% | 68.34% |
| SOUTH SEOUL | 4,618 | 99.10% | 95.50% | 52.71% |
| SEOUL | 4,913 | 99.70% | 99.40% | 59.86% |
| AVERAGE | | 98.89% | 97.72% | 56.89% |

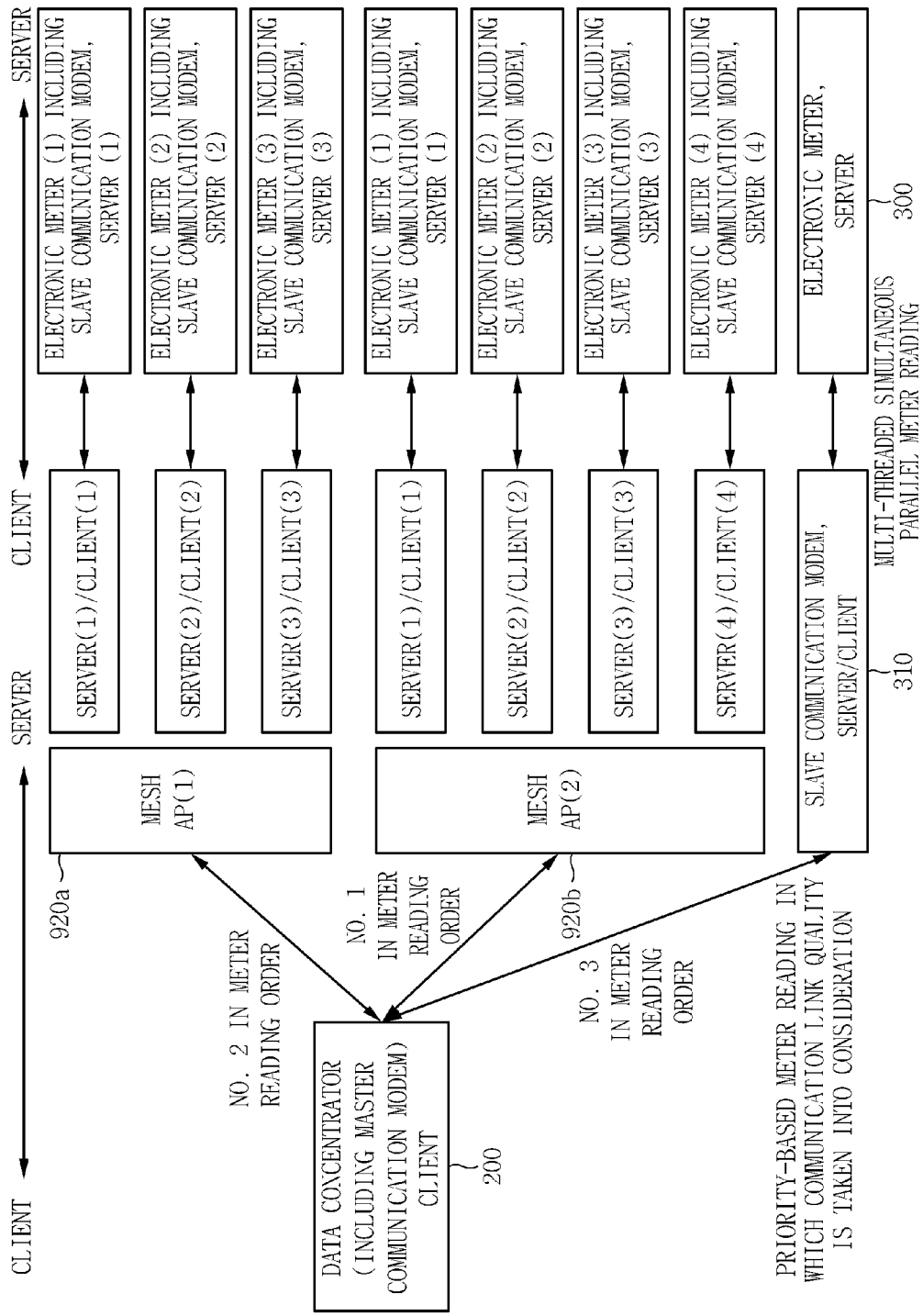

ADVANCED METERING INFRASTRUCTURE SYSTEM FOR GUARANTEEING RELIABLE TRANSMISSION OF METER DATA AND ADVANCED METERING METHOD USING THE SAME

CROSS REFERENCE TO RELATED APPLICATION

This application claims the benefit of Korean Patent Application No. KR 10-2011-0075810, filed on Jul. 29, 2011, which is hereby incorporated by reference in its entirety into this application.

BACKGROUND OF THE INVENTION

1. Technical Field

The present invention relates generally to automatic meter reading technology for remotely collecting data about various types of energy consumption (electricity, gas, water, heat, etc.) from individual customers using wired/wireless communication and, more particularly, to an advanced metering infrastructure system and advanced metering method using the system, which can guarantee the reliable transmission of meter data while utilizing existing wired or wireless communication methods, such as Power Line Communication (PLC), ZigBee, Binary Code Division Multiple Access (B-CDMA) or Wireless Fidelity (WiFi) communication which can be constructed at comparatively low cost and can be easily constructed using a self-organizing network.

2. Description of the Related Art

Generally, as scientific technology has been developed, the phenomenon in which tasks performed by human beings are automated or processed by machines has become commonplace. Among these tasks, automatic meter reading includes Automatic Metering Infrastructure (AMI) technology for automatically measuring the amount of water, electricity, gas, etc. consumed by individual homes or offices from a remote location without a meterman having to personally visit the home or office.

As shown in FIG. 1, a typical AMI system includes an electronic meter 300, a wired or wireless slave communication modem 310, a meter reading server 100, and a data concentrator 200. The electronic meter 300 (such as an electronic watt-hour meter, an electronic gas meter, an electronic water meter, etc.) measures/determines and stores various types of energy consumption. The slave communication modem 310 can be mounted inside or outside of the electronic meter 300. The meter reading server 100 manages meter data, automatically bills customers for corresponding energy consumption based on the meter data, and manages the customers at the center of the system. The data concentrator 200 is disposed between the meter reading server 100 and the electronic meter 300 and is configured to collect various types of energy consumed by each customer from the electronic meter 300 using wired or wireless communication, and transmit information about the collected energy consumption to the meter reading server 100.

Communication between the data concentrator 200 and the meter reading server 100 is performed either by using optical communication such as for a Hybrid Fiber Coaxial (HFC) network that guarantees high reliability, or by leasing and using the lines of 3G/4G communication companies. In contrast, narrowband or wideband wired communication such as Power Line Communication (PLC), and small-power wireless communication that uses an unlicensed frequency band such as ZigBee, Binary Code Division Multiple Access (B-CDMA) or Wireless Fidelity (WiFi), can be used as the wired or wireless communication means used between the data concentrator 200 and the electronic meter 300.

Since all of methods of carrying out the above-described wireless communication between the data concentrator 200 and the electronic meter 300 make use of an unlicensed frequency band (an Industrial, Scientific and Medical (ISM) band), only the maximum transmission power needs to be observed in the licensed frequency band without preliminary notice having to be given, and thus there is the advantage of a communication network being easily constructed at low cost. In contrast, it is disadvantageous in that due to variations in the external environment such as noise and disturbances, the reliability of communication cannot be guaranteed.

Representative international standard communication protocols used for an advanced metering infrastructure include IEC 62056 standard in Europe and Asia and ANSI C12 standards in North America. Both the IEC 60256 and ANSI C12 standards are based on a server-client structure. This denotes a structure in which a data concentrator (acting as a client), or a meter reading server (acting as a client) in the absence of a data concentrator, requests meter data, and in which an electronic meter (acting as a server) responds only to the request for meter data. The meter reading engines of data concentrators that are currently being operated in Korea are designed to periodically perform a meter reading process every 15 minutes, and sequentially read meter data from a maximum of 200 electronic meters in a polling manner during one 15 minute cycle. A premise of such a meter reading process is that the stability and reliability of communication between the client and the server are guaranteed. In this case, in order to communicate with electronic meters, the communication interface of a slave communication modem (PLC, B-CDMA, ZigBee or WiFi modem) mounted outside or inside of each electronic meter provides reliable communication in a wired manner, such as optical communication or RS-232/485 communication. However, methods used by communication between the slave communication modem and the master communication modem of a data concentrator typically installed on a telegraph pole are communication methods, such as PLC and WiFi, which are mainly based on shared media. Since these communication methods respectively use a power line and radio waves as communication media, they are sensitive to variations in the external environment, and are then vulnerable to a channel environment that is varying in real time, noise and interference. In addition, since those communication methods use Carrier Sense Multiple Access/Collision Avoidance (CSMA/CA) protocol methods based on mutual competition in shared media, a temporary data transmission delay or an intermittent communication link failure inevitably results, and thus a problem arises in that stability and reliability are very unsatisfactory.

For example, the rates of success in the reading of pieces of load profile (LP) data collected from the watt-hour meters of 5 to 50 households during one 15 minute cycle according to the PLC method that is currently being used in Korea Electric Power Corporation (KEPCO) are shown in FIG. 2. The success rate of periodic meter reading indicates that if meter reading has succeeded only once among a plurality of meter reading trials within 24 hours, it is determined that successful meter reading is performed. This rate is 98.9% on the average for the whole country, but the success rate of LP meter reading is maintained merely at 56.9%. In particular, it can be seen that compared to periodic meter reading or current meter reading (with a data size of about 100 bytes), the success rate of LP meter reading is very low. The reason for this is that due to transmission errors caused by the instability of a link which may occur during the transmission of LP data having a size of several tens of Kbytes, and several retrials of meter reading caused by the occurrence of the transmission errors, a lot of time is wasted collecting meter data, and thus it is impossible to collect LP data from the watt-hour meters of other downstream customers during the period of 15 minutes. Furthermore, in the future, because Demand Response (DR) service is being promoted, it is expected that the time for which LP data is collected (the recording cycle) will become shorter, and thus a fundamental solution method for this is required.

SUMMARY OF THE INVENTION

Accordingly, the present invention has been made keeping in mind the above problems occurring in the prior art, and an object of the present invention is to provide an advanced metering infrastructure system and advanced metering method using the system, which can guarantee the reliable transmission of meter data while utilizing an existing wired or wireless communication method.

In accordance with an aspect of the present invention to accomplish the above object, there is provided an advanced metering infrastructure system, including a plurality of electronic meters, each of which being configured to measure and store an amount of energy consumed by each customer and provided with a slave communication modem mounted outside or inside thereof; a data concentrator configured to collect meter data from the electronic meters via a master communication modem that performs wired or wireless communication with the slave communication modems of the electronic meters; and a meter reading server configured to receive and manage the meter data collected by the data concentrator, wherein the master communication modem of the data concentrator and each of the slave communication modems of the electronic meters implement mutual communication interfaces using a protocol stack including a network layer; an application layer in which a meter reading program is implemented; and a modem performance analysis layer disposed between the network layer and the application layer and configured to analyze quality of a communication link between the master communication modem and each slave communication modem.

Preferably, the meter reading program of the application layer may assign meter reading priorities to the plurality of electronic meters based on the communication link quality analyzed by the modem performance analysis layer and then sequentially perform a meter reading process on the electronic meters in order of the assigned meter reading priorities.

Preferably, the meter reading may be retried a preset number of times on an electronic meter that failed to be read.

Preferably, the modem performance analysis layer may include a sensing module for collecting at least one performance index of the physical layer or the media access control layer.

Preferably, the at least one performance index of the physical layer or the media access control layer may be selected from the group consisting of Bit Error Rate (BER), Signal to Noise Ratio (SNR), Received Signal Strength (RSS) and Media Access Control (MAC) retransmission count.

Preferably, the modem performance analysis layer may include a network monitoring module for collecting network topology information about the network layer.

Preferably, the network topology information about the network layer may include a number of communication target terminals or variations in network topology.

Preferably, the modem performance analysis layer may include an analysis module for analyzing the quality of communication link using the at least one performance index collected by the sensing module or the network topology information collected by the network monitoring module.

Preferably, the system may perform an N:N simultaneous parallel meter reading process based on a multi-threaded manner.

Preferably, when a repeater is used between a slave communication modem of a relevant electronic meter and the master communication modem of the data concentrator, the modem performance analysis layer may analyze quality of a communication link for a section between the master communication modem and the repeater, a section between the repeater and the slave communication modem, or a section between the slave communication modem and the electronic meter, and perform a meter reading process in a store-and-forward manner based on the analyzed quality of the communication link for the section.

In accordance with another aspect of the present invention, there is provided an advanced metering method, including measuring and storing an amount of energy consumed by each customer using a plurality of electronic meters, each provided with a slave communication modem mounted outside or inside thereof, analyzing quality of a communication link between the slave communication modem of each electronic meter and a master communication modem of a data concentrator that collects meter data from the electronic meters; transmitting the meter data from the electronic meters to the data concentrator, based on the analyzed quality of the communication link; and transmitting the meter data collected by the data concentrator to a meter reading server.

Preferably, the transmitting the meter data from the electronic meters to the data concentrator may be configured to assign meter reading priorities to the plurality of electronic meters based on the analyzed quality of communication link and then sequentially transmit the meter data in order of the assigned meter reading priorities.

Preferably, the transmitting the meter data from the electronic meters to the data concentrator may be configured to retry meter reading a preset number of times on an electronic meter that failed to be read.

Preferably, the analyzing quality of the communication link may be configured to analyze the quality of the communication link between the slave communication modem of the electronic meter and the master communication modem of the data concentrator by using at least one performance index selected from the group consisting of Bit Error Rate (BER), Signal to Noise Ratio (SNR), Received Signal Strength (RSS) and Media Access Control (MAC) retransmission count.

Preferably, the analyzing quality of the communication link may be configured to analyze the quality of the communication link between the slave communication modem of the electronic meter and the master communication modem of the data concentrator using network topology information that includes a number of communication target terminals or variations in network topology.

Preferably, the transmitting the meter data from the electronic meters to the data concentrator may be performed using an N:N simultaneous parallel meter reading process based on a multi-threaded manner.

Preferably, the transmitting the meter data from the electronic meters to the data concentrator may be configured such that when a repeater is used between a slave communication modem of a relevant electronic meter and the master communication modem of the data concentrator, quality of a communication link for a section between the master communication modem and the repeater, a section between the repeater and the slave communication modem, or a section between the slave communication modem and the electronic meter is analyzed, and the transmitting is performed according to a store-and-forward manner-based meter reading process based on the analyzed quality of the communication link for the section.

BRIEF DESCRIPTION OF THE DRAWINGS

The above and other objects, features and advantages of the present invention will be more clearly understood from the following detailed description taken in conjunction with the accompanying drawings, in which:

FIG. 2 is a diagram of a table showing the success rates of the meter reading of Load Profile (LP) data collected from watt-hour meters in meter reading target households according to power line communication;

FIG. 9 is a diagram schematically showing an advanced metering infrastructure system to which a communication link quality-based priority meter reading method is applied to an upper communication link and a multi-threaded simultaneous parallel meter reading method is applied to a lower communication link, on the basis of a terminal that performs a store-and-forward function and has a client/server meter reading protocol, according to a further embodiment of the present invention.

DESCRIPTION OF THE PREFERRED EMBODIMENTS

Figure 1:
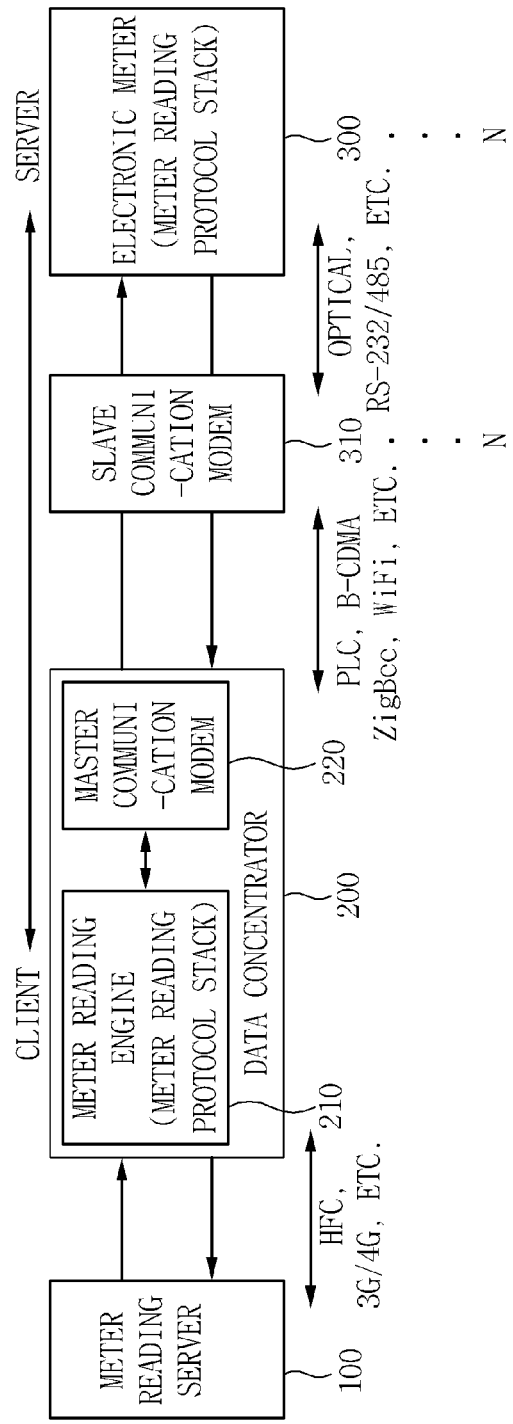
FIG. 1 is a diagram schematically showing a conventional advanced metering infrastructure system.

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

Figure 3:
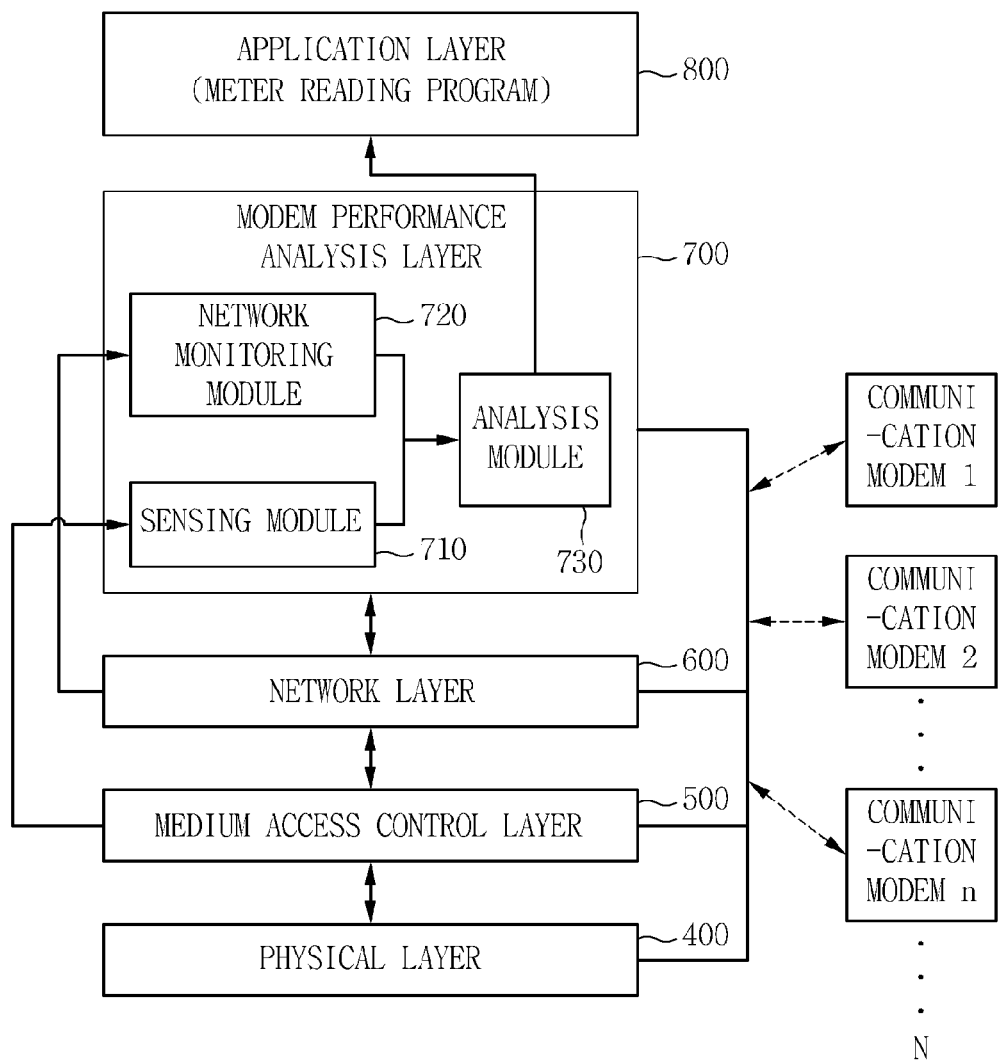
FIG. 3 is a diagram schematically showing a protocol stack required to implement a communication interface between the communication modems of an advanced metering infrastructure system according to an embodiment of the present invention.

FIG. 3 is a diagram schematically showing a protocol stack required to implement a communication interface between the communication modems of an advanced metering infrastructure system according to an embodiment of the present invention.

As shown in FIG. 3, the protocol stack of the advanced metering infrastructure system according to the embodiment of the present invention basically includes a physical layer 400, a media access control layer 500, a network layer 600, and an application layer 800 in which a meter reading program is installed. In addition, the meter reading protocol stack further includes a modem performance analysis layer 700 disposed between the network layer 600 and the application layer 800 and configured to analyze the quality of a communication link (communication link quality) between the master communication modem 220 of a data concentrator 200 (refer to FIG. 1) and the slave communication modem 310 of an electronic meter 300 (refer to FIG. 1). Here, the modem performance analysis layer 700 includes a sensing module 710, a network monitoring module 720, and an analysis module 730. The individual modules constituting the modem performance analysis layer 700 will be described below. First, the sensing module 710 collects at least one performance index such as Bit Error Rate (BER), Signal to Noise Ratio (SNR), Received Signal Strength (RSS), or Media Access Control (MAC) retransmission count, as the at least one performance index of the physical layer 400 or the MAC layer 500 between communication modems. The network monitoring module 720 usually monitors the number of surrounding communication target terminals and variations in network topology such as single-hop or multi-hop configuration, and then collects network topology information about the network layer 600. Further, the analysis module 730 analyzes the at least one performance index of the physical layer 400 or the media access control layer 500 that have been collected by the sensing module 710, or analyzes the network topology information about the network layer 600 that has been collected by the network monitoring module 720, and then provides information that allows the meter reading program of the application layer 800 to execute the meter reading process primarily on the communication modem having an optimal link quality.

For example, if it is determined that the Received Signal Strength (RSS) of a specific communication modem collected by the sensing module 710 is lower than a threshold which is the minimum limit at which communication is possible due to interference, fading or the like, and that communication is impossible, an electronic meter 300 connected to the specific communication modem can be excluded from the list of those targets to be metered at that time. Further, if the MAC retransmission count has increased for a specific communication modem, it can also be anticipated that a relevant communication channel is unstable because of interference, fading or the like. Accordingly, an electronic meter 300 connected to the specific communication modem is excluded from the list of those targets to be metered at that time or, alternatively, the meter reading sequence of the electronic meter 300 is deferred, thus improving the efficiency of meter reading.

Figure 4:
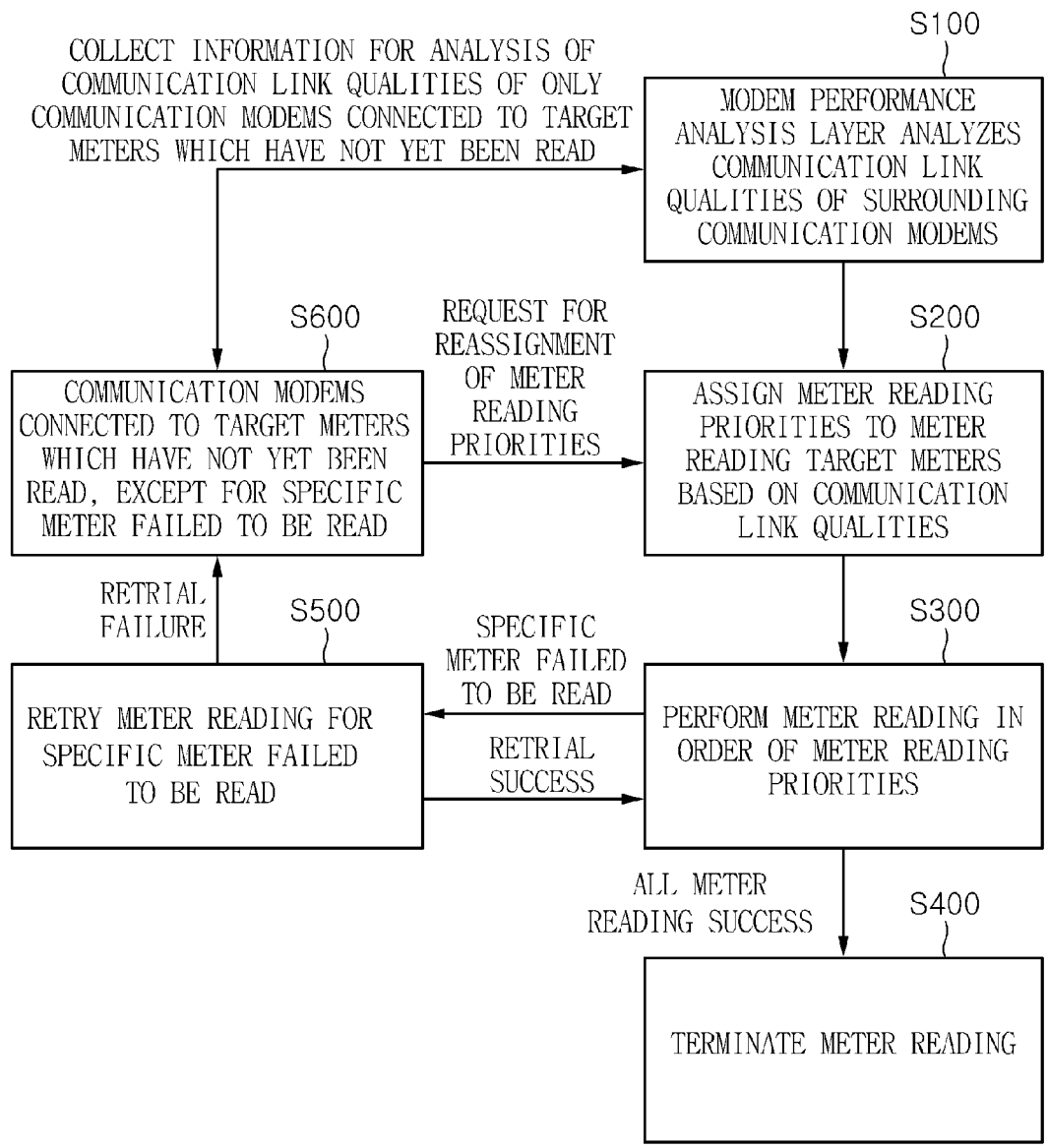
FIG. 4 is a flowchart showing a meter reading process that considers communication link quality analyzed by the modem performance analysis layer of FIG. 3.

FIG. 4 is a flowchart showing a meter reading process that considers the quality of a communication link analyzed by the modem performance analysis layer 700 of FIG. 3.

As shown in FIG. 4, in a meter reading process according to an embodiment of the present invention, the modem performance analysis layer 700 analyzes the qualities of communication links for surrounding communication modems in real time at step S100. Next, the meter reading engine 210 of the data concentrator 200 assigns meter reading priorities to the electronic meters 300 which are meter reading targets, on the basis of the communication link qualities analyzed by the modem performance analysis layer 700 at step S200, and reads the electronic meters 300 in order of the assigned meter reading priorities at step S300.

If as a result of the meter reading at step S300, meter reading has been successfully performed on all of the electronic meters 300 which are meter reading targets, the meter reading is terminated at step S400.

In contrast, if as the result of the meter reading at step S300, a specific electronic meter 300 has failed to be read because of an unpredictable event even though real-time communication link qualities had been considered, meter reading is retried a preset number of times for the specific electronic meter 300 that has failed to be read at step S500. As a result of the retrial at S500, if the specific electronic meter 300 has been successfully read, meter reading is continuously performed in order of the subsequent meter reading priorities at step S300. However, in spite of the retrials conducted a preset number of times, if the specific electronic meter 300 cannot be read, the qualities of the communication links of communication modems connected to the remaining electronic meters 300, which have not yet been read, other than the specific electronic meter 300 which failed to be read are re-analyzed in real time. The meter reading priorities of the electronic meters 300 which have not yet been read are reassigned based on the re-analyzed communication link qualities at step S600, and then the meter reading process is repeated.

The above-described meter reading process is performed until meter reading of all the electronic meters 300 which are meter reading targets within a meter reading cycle has been completed, and it is preferable to check whether the problem of communication or a meter itself is present with respect to an electronic meter 300 which was not read within the meter reading cycle.

Figure 5:
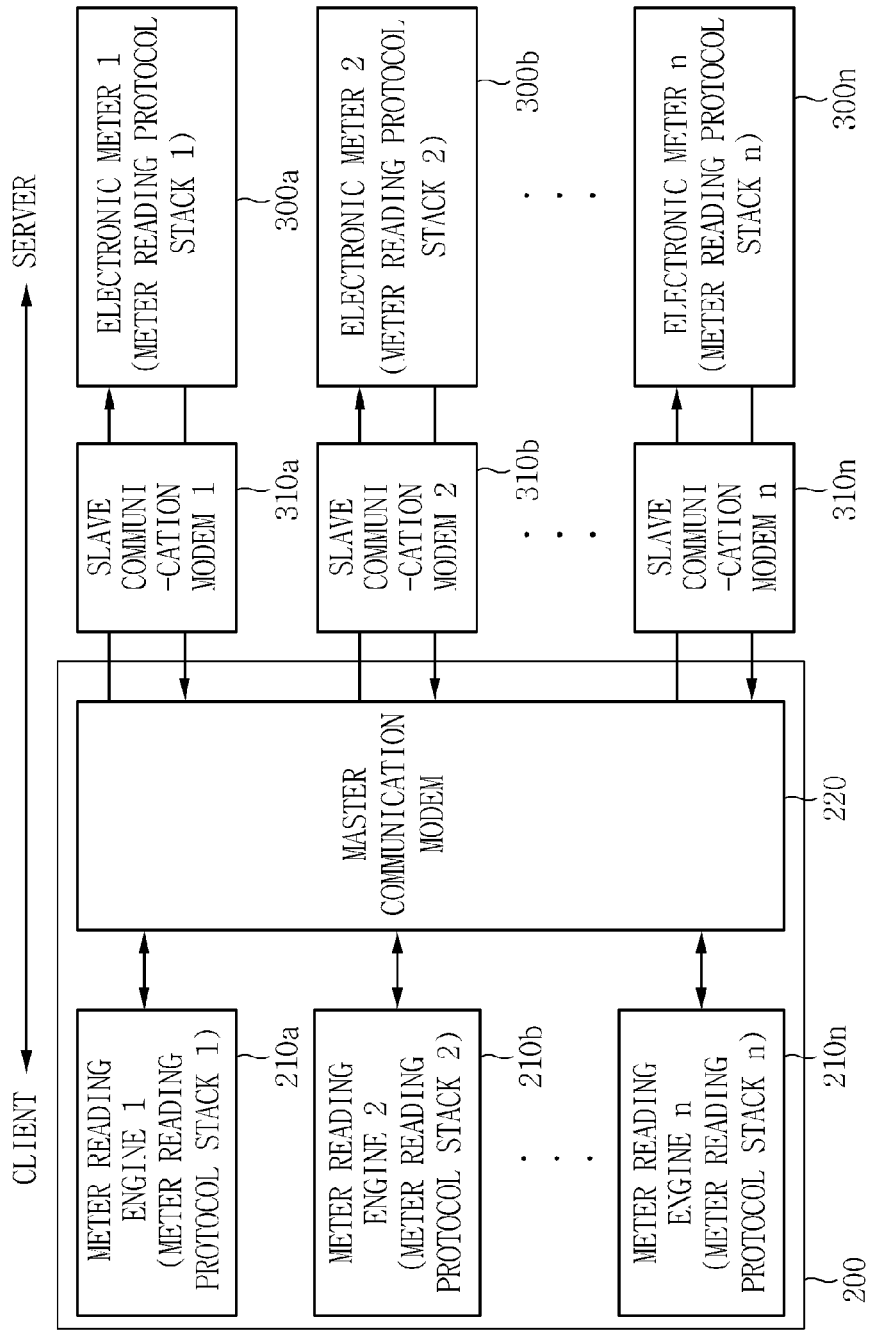
FIG. 5 is a diagram schematically showing an advanced metering infrastructure system to which using an N (client):N (server) multi-threaded manner is applied according to the present invention.

In the above description, the advanced metering infrastructure system conforming to 1 (client):N (server) polling manner has been described. However, according to this description, even if meter reading is performed in consideration of the real-time quality of the communication link by the modem performance analysis layer, at least a minimum meter reading time is required to read each electronic meter which is a meter reading target, thus making it impossible to immediately use the communication link quality that is provided in real time. In order to solve the disadvantage of the above-described polling manner to improve meter reading speed and further increase the success rate of meter reading, an N (client):N (server) multi-threaded manner that enables meter reading on a plurality of independent server-client structures to be simultaneously performed in parallel can also be applied to the advanced metering infrastructure system using the meter reading process according to the present invention, as shown in FIG. 5. In this case, the computational speed and memory environment of a Micro Controller Unit (MCU) that drives a communication terminal are detected, so that it is preferable to set a suitable number of server-client structures. If it is assumed that according to the multi-threaded meter reading process that considers communication link qualities, five server-client meter reading programs are to be operated for a total of 10 electronic meters that are meter reading targets, it is preferable to assign meter reading priorities to the electronic meters on the basis of the communication link qualities analyzed by the modem performance analysis layer, to primarily and simultaneously read five upper electronic meters having superior communication link quality in parallel, and to subsequently and simultaneously read five lower electronic meters having inferior communication link quality.

Figure 6:
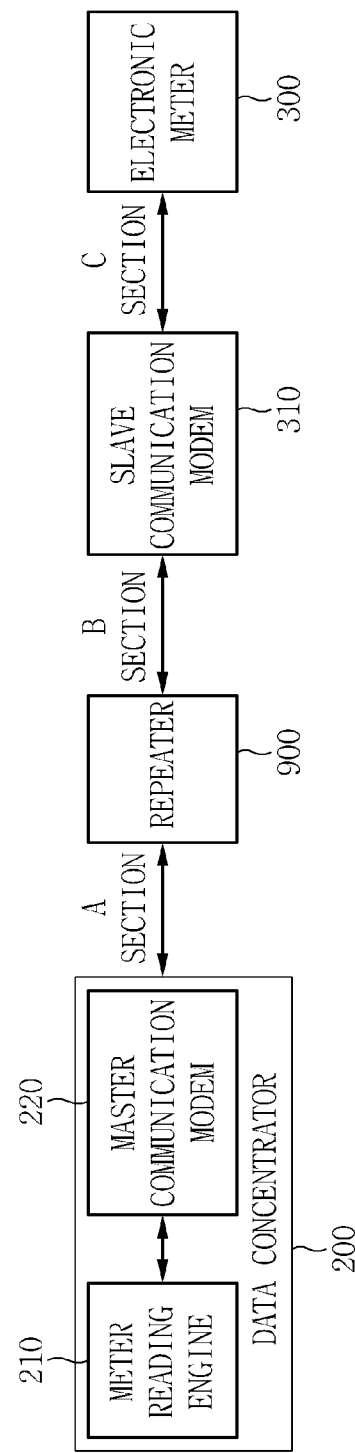
FIG. 6 is a diagram schematically showing an advanced metering infrastructure system in which a repeater is disposed between a master communication modem and a slave communication modem according to the present invention.

FIG. 6 is a diagram schematically showing an advanced metering infrastructure system according to the present invention in which at least one repeater 900 is disposed between the master communication modem 220 of a data concentrator 200 typically installed on the electric pole of a transformer and the slave communication modem 310 of an electronic meter 300 installed on a customer side in order to construct a more stable meter reading communication network in the case where the distance between the master communication modem 220 and the slave communication modem 310 is long and then direct communication is impossible.

The above-described meter reading method is configured to analyze the quality of a communication link by recognizing the entire communication section corresponding to A+B+C as a single communication channel in an end-to-end manner between a meter reading engine (a client) and a meter (a server). However, since the qualities of communication links are different from one another between communication sections A, B, and C, meter reading can be performed to be further segmented and optimized in consideration of the qualities of communication links for respective communication sections A, B and C, if meter reading is separately performed by independent server-client structures for the respective communication sections A, B and C rather than meter reading being performed by an end-to-end server-client structure. The network monitoring module 720 of the modem performance analysis layer 700 according to the present invention detects a network topology environment such as the use of the repeater 900, and the analysis module 730 transfers information about the qualities of the communication links for the respective communication sections A, B and C that have been analyzed based on the network topology environment to the meter reading engine 210.

Figure 7:
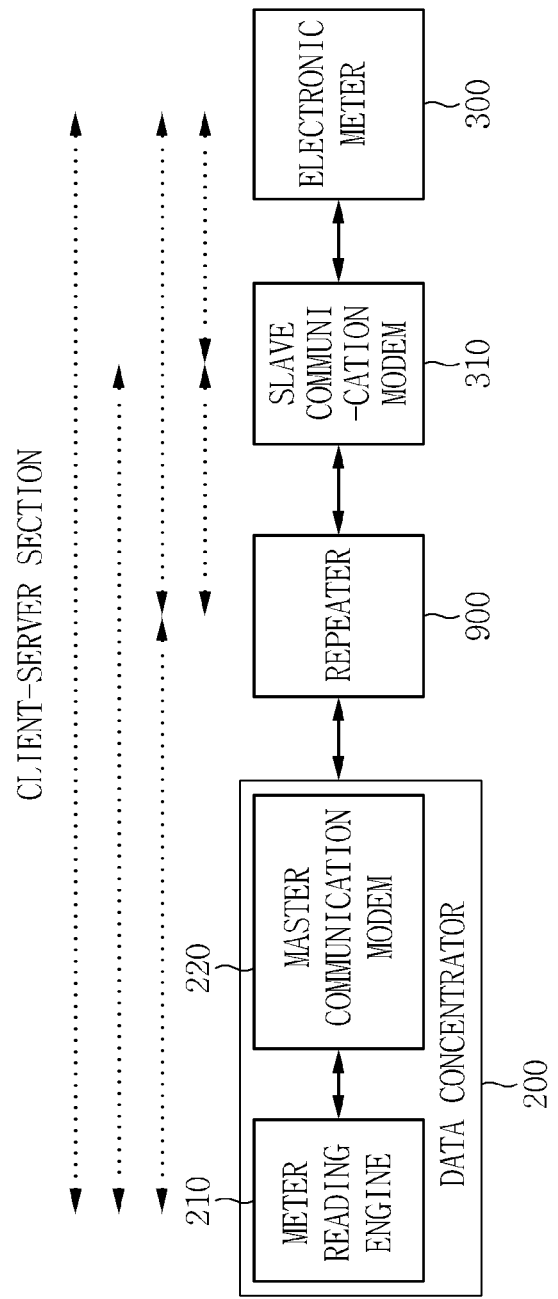
FIG. 7 is a diagram schematically showing an advanced metering infrastructure system to which a store-and-forward manner is applied according to the present invention.

For example, when a meter reading protocol stack is implemented in the repeater 900 or the slave communication modem 310, and the analysis module 730 of the modem performance analysis layer 700 perceives that there is a situation indicating that communication link quality is good in the communication section B+C and is inferior in the communication section A, the repeater 900 collects meter data from the electronic meters 300, and stores the meter data, as shown in FIG. 7. Thereafter, when the communication link quality of the communication section A is improved and the meter reading engine 210 requests meter data, the repeater 900 transmits the meter data stored therein to the data concentrator 200, without the electronic meter 300 transmitting the meter data. This store-and-forward structure can improve the reliability of acquiring meter data by minimizing an independent server-client communication section. Such a store-and-forward manner may enable the meter reading protocol stack to be easily implemented if an MCU and memory used by the repeater 900 or the slave communication modem 310 are exploited, without adding separate hardware.

Figure 8:
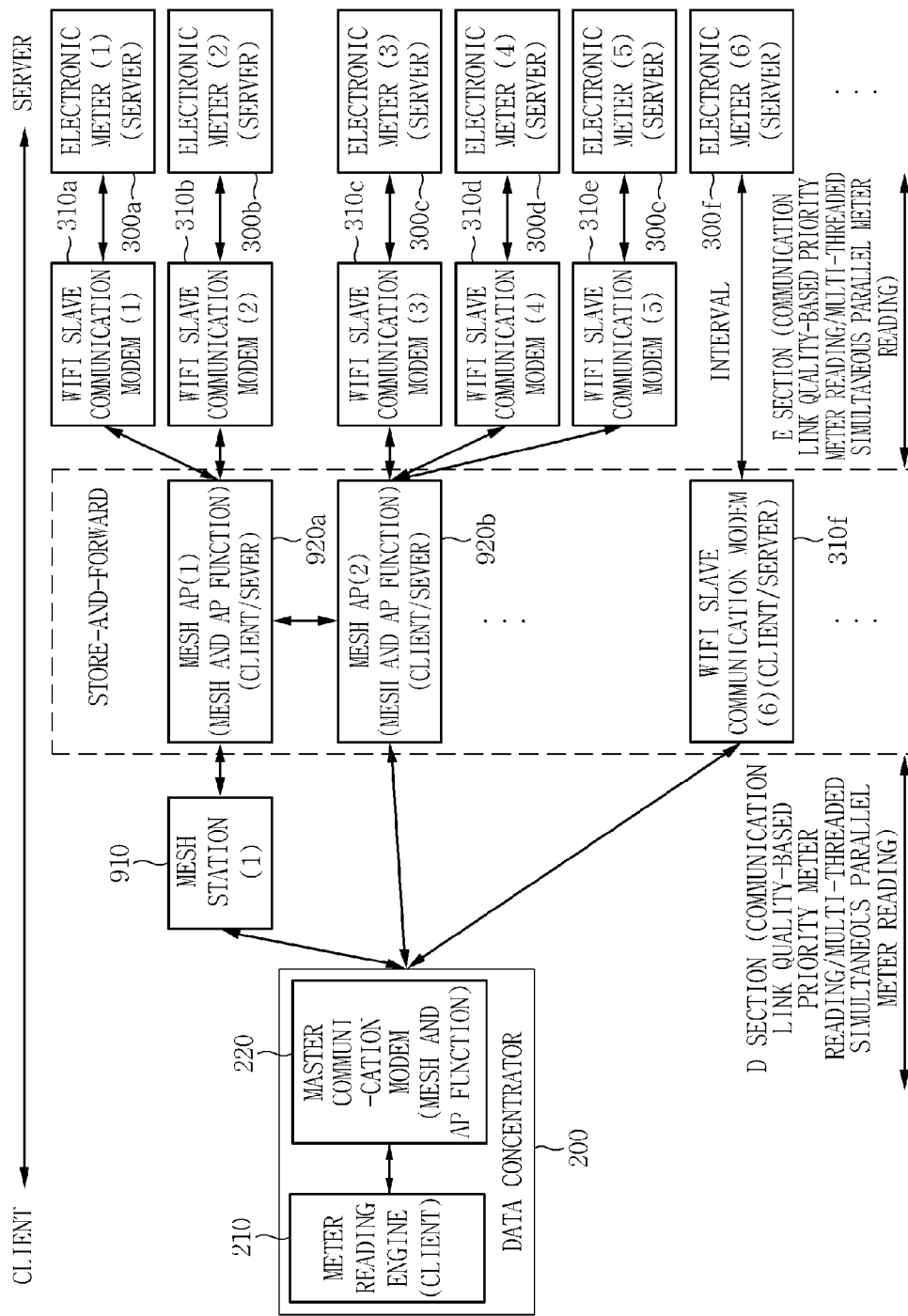
FIG. 8 is a diagram schematically showing an advanced metering infrastructure system which considers the quality of a communication link and to which a store-and-forward manner and an N (client):N (server) multi-threaded simultaneous parallel meter reading process are applied according to another embodiment of the present invention.

FIG. 8 is a diagram schematically showing an advanced metering infrastructure system according to another embodiment of the present invention.

According to another embodiment of the present invention, an advanced metering infrastructure system can be configured in which communication between the master communication modem 220 of a data concentrator 200 and the slave communication modem 310 of an electronic meter 300 is based on a WiFi-mesh network using mesh Access Points 920a and 920b and in which communication link quality is taken into consideration, wherein both a store-and-forward manner and an N(client):N(server) multi-threaded simultaneous parallel meter reading process are applied to the advanced metering infrastructure system, as shown in FIG. 8.

As shown in FIG. 8, when the distance between the master communication modem 220 of the data concentrator 200 having the function of a mesh and an Access Point (AP) and the slave communication modem 310 is short, a direct communication link (a communication link between the master communication modem 220 and a WiFi slave communication modem (6) 310f) can be configured using WiFi radio communication. When such a distance is long the communication link can be configured to be extended using one or more mesh stations only having a mesh function without having an AP function. In FIG. 8, a mesh station (1) 910 is used to construct a more stable communication network between the master communication modem 220 and a mesh AP (1) 920a. However, it is apparent that depending on the circumstances, one or more other mesh stations can be additionally used. In the case of a multi-communication link using mesh stations, it is preferable to install a mesh AP around the slave communication modem 310 mounted outside or inside of the electronic meter, thus enabling a stable communication link to be configured.

The mesh APs 920a and 920b or the WiFi slave communication modem (6) 310f can collect meter data while communicating with the electronic meters 300a to 300f independently of the data concentrator 200. In this case, if the qualities of the communication links provided downstream of the mesh APs 920a and 920b or the WiFi slave communication modem (6) 310f are excellent, the clients, that is, the mesh APs 920a and 920b or the WiFi slave communication modem (6) 310f, primarily collect meter data from the electronic meters 300a to 300f which are acting as servers, and then store the collected meter data. Thereafter, when the meter reading engine 210 of the data concentrator 200 that is the client requests meter data, the mesh APs 920a and 920b or the WiFi slave communication modem (6) 310f function as a server for transferring the stored meter data between the master and the slave. Further, the mesh APs 920a and 920b or the WiFi slave communication modem (6) 310f that have completed the collection of meter data while communicating with the electronic meters 300a to 300f may notify the data concentrator 200, which is the client, of the situation of the meter reading having been completed using a notification message, rather than a meter data request/response method. The data concentrator 200 may also assign meter reading priorities by additionally taking into consideration such information. That is, it is preferable to minimize a server-client communication section that is operated independently of and in parallel with an upper communication link section (D section) and a lower communication link section (E section) around the terminals (in FIG. 8, the mesh AP (1) 920a, the mesh AP (2) 920b, and the WiFi slave communication modem (6) 310f) which perform a store-and-forward function and have a client/server meter reading protocol.

Here, the WiFi-mesh communication method may be replaced by another communication method such as PLC, ZigBee or B-CDMA. Furthermore, it is apparent that with respect to the upper communication link section (D section) and the lower communication link (E section) around the terminals that perform the store-and-forward function and have a client/server meter reading protocol, a communication link quality-based priority meter reading method and a multi-threaded simultaneous parallel meter reading method may be differently applied to the respective intervals according to the environment of meter reading or may also be simultaneously applied to the same section.

FIG. 9 is a diagram schematically showing an advanced metering infrastructure system to which a communication link quality-based priority meter reading method is applied to an upper communication link and a multi-threaded simultaneous parallel meter reading method is applied to a lower communication link, on the basis of a terminal that performs a store-and-forward function and has a client/server meter reading protocol, according to a further embodiment of the present invention.

As shown in FIG. 9, since mesh APs 920a and 920b or a slave communication modem (1) 310 are typically installed around electronic meters 300 so that the qualities of communication links with the electronic meters 300 can be maximally increased, it may not be necessary to assign meter reading priorities in consideration of communication link qualities. However, since the mesh APs 920a and 920b which are clients must collect meter data from electronic meters 300 provided in a maximum of 10 to 20 customers functioning as servers within the shortest time, meter reading performed between the electronic meter 300 and the mesh APs 920a and 920b or the slave communication modem 310 is preferably performed using a multi-threaded simultaneous parallel meter reading method. Further, after the mesh APs 920a and 920b functioning as a server complete the collection of meter data from the electronic meters 300, they notify the data concentrator 200, which is the client, of the situation of the meter reading having been completed using a notification message. The data concentrator 200 collects information about the qualities of communication links with the mesh APs 920a and 920b or the slave communication modem 310 in real time, assigns meter reading priorities by taking into consideration both the collected information about the real-time communication link qualities and the meter reading completion information transmitted from the mesh APs 920a and 920b, and then proceeds to perform the meter reading process.

As described above, optimal embodiments have been disclosed in the drawings and the specification. In this case, methods by which communication link qualities are taken into consideration and a store-and-forward manner and a multi-threaded N:N simultaneous parallel meter reading process are applied to individual communication sections have been described. However, these descriptions are merely intended to describe the present invention and are not intended to limit the forms of application or the scope of the present invention as disclosed in the accompanying claims. Further, although a communication section has been described as being limited to a section between a data concentrator and slave communication modems or electronic meters, it is apparent that such a communication section can also be applied even to a communication section between a meter reading server and a data concentrator or between the meter reading server and electronic meters. Therefore, those skilled in the art will appreciate that various modifications and other equivalent embodiments are possible from the above descriptions. Accordingly, the scope of the present invention should be defined by the technical spirit of the accompanying claims.

As described above, the present invention can provide an advanced metering infrastructure system and advanced metering method using the system, which can guarantee the reliable transmission of meter data while using existing communication methods, such as power line communication, ZigBee, Binary CDMA (B-CDMA) or WiFi communication, which enables communication for sections between a data concentrator for advanced meter reading and electronic meters to be easily constructed using an inexpensive self-organizing network.

In particular, the present invention is advantageous in that advanced meter reading can be more stably and more rapidly performed in such a way that a meter reading program implemented on an application layer allows the qualities of communication links to be taken into consideration in the meter reading process by means of a sensing module, a network monitoring module, and an analysis module, compared to the conventional simple end-to-end server-client-based polling meter reading scheme, wherein the sensing module collects at least one performance index such as the Bit Error Rate (BER), Signal to Noise Ratio (SNR), Received Signal Strength (RSS) or MAC retransmission count of the physical layer or the media access control layer of each communication modem, the network monitoring module monitors network topology information such as the number of communication target terminals and single-hop or multi-hop configuration, and the analysis module analyzes the quality of communication links using the at least one performance index collected by the sensing module and the network topology information collected by the network monitoring module.

Furthermore, the present invention performs automatic meter reading by combining a store-and-forward manner, a multi-threaded simultaneous parallel processing method, etc. which utilize two or more server-client structures capable of independently performing a meter reading process, thus preventing a bottleneck phenomenon that may occur when it is desired to collect large-capacity meter data, and further improving the efficiency and reliability of automatic meter reading thanks to the enhancement of the meter reading success rate and meter reading speed.

What is claimed is:

1. An advanced metering infrastructure system, comprising:
   a plurality of electronic meters, each of which being configured to measure and store an amount of energy consumed by each customer and provided with a slave communication modem mounted outside or inside thereof;
   a data concentrator configured to collect meter data from the electronic meters via a master communication modem that performs wired or wireless communication with the slave communication modems of the electronic meters; and
   a meter reading server configured to receive and manage the meter data collected by the data concentrator,
   wherein the master communication modem of the data concentrator and each of the slave communication modems of the electronic meters implement mutual communication interfaces using a protocol stack comprising:
   a network layer;
   an application layer in which a meter reading program is implemented; and
   a modem performance analysis layer disposed between the network layer and the application layer and configured to analyze quality of a communication link between the master communication modem and each slave communication modem,
   wherein the meter reading program of the application layer assigns meter reading priorities to the plurality of electronic meters based on the communication link quality analyzed by the modem performance analysis layer and then sequentially performs a meter reading process on the electronic meters in order of the assigned meter reading priorities.

2. The advanced metering infrastructure system of claim 1, wherein meter reading is retried a preset number of times on an electronic meter that failed to be read.

3. The advanced metering infrastructure system of claim 1, wherein the modem performance analysis layer comprises a sensing module for collecting at least one performance index of the physical layer or the media access control layer.

4. The advanced metering infrastructure system of claim 3, wherein the at least one performance index of the physical layer or the media access control layer is selected from the group consisting of Bit Error Rate (BER), Signal to Noise Ratio (SNR), Received Signal Strength (RSS) and Media Access Control (MAC) retransmission count.

5. The advanced metering infrastructure system of claim 1, wherein the modem performance analysis layer comprises a network monitoring module for collecting network topology information about the network layer.

6. The advanced metering infrastructure system of claim 5, wherein the network topology information about the network layer comprises a number of communication target terminals or variations in network topology.

7. The advanced metering infrastructure system of claim 1, wherein the modem performance analysis layer comprises:
   a sensing module for collecting at least one performance index of the physical layer or the media access control layer;
   a network monitoring module for collecting network topology information about the network layer; and
   an analysis module for analyzing the quality of communication link using the at least one performance index collected by the sensing module or the network topology information collected by the network monitoring module.

8. The advanced metering infrastructure system of claim 1, wherein the system performs an N:N simultaneous parallel meter reading process based on a multi-threaded manner.

9. The advanced metering infrastructure system of claim 1, wherein when a repeater is used between a slave communication modem of a relevant electronic meter and the master communication modem of the data concentrator, the modem performance analysis layer analyzes quality of a communication link for a section between the master communication modem and the repeater, a section between the repeater and the slave communication modem, or a section between the slave communication modem and the electronic meter, and performs a meter reading process in a store-and-forward manner based on the analyzed quality of the communication link for the section.

10. An advanced metering method, comprising:
   measuring and storing an amount of energy consumed by each customer using a plurality of electronic meters, each of which being provided with a slave communication modem mounted outside or inside thereof;
   analyzing quality of a communication link between the slave communication modem of each electronic meter and a master communication modem of a data concentrator that collects meter data from the electronic meters;
   transmitting the meter data from the electronic meters to the data concentrator, based on the analyzed quality of the communication link; and
   transmitting the meter data collected by the data concentrator to a meter reading server,
   wherein the transmitting the meter data from the electronic meters to the data concentrator is configured to assign meter reading priorities to the plurality of electronic meters based on the analyzed quality of the communication link and then sequentially transmit the meter data in order of the assigned meter reading priorities.

11. The advanced metering method of claim 10, wherein the transmitting the meter data from the electronic meters to the data concentrator is configured to retry meter reading a preset number of times on an electronic meter that failed to be read.

12. The advanced metering method of claim 10, wherein the analyzing quality of the communication link is configured to analyze the quality of the communication link between the slave communication modem of the electronic meter and the master communication modem of the data concentrator by using at least one performance index selected from the group consisting of Bit Error Rate (BER), Signal to Noise Ratio (SNR), Received Signal Strength (RSS) and Media Access Control (MAC) retransmission count.

13. The advanced metering method of claim 10, wherein the analyzing quality of the communication link is configured to analyze the quality of the communication link between the slave communication modem of the electronic meter and the master communication modem of the data concentrator using network topology information that comprises a number of communication target terminals or variations in network topology.

14. The advanced metering method of claim 10, wherein the transmitting the meter data from the electronic meters to the data concentrator is performed using an N:N simultaneous parallel meter reading process based on a multi-threaded manner.

15. The advanced metering method of claim 10, wherein the transmitting the meter data from the electronic meters to the data concentrator is configured such that when a repeater is used between a slave communication modem of a relevant electronic meter and the master communication modem of the data concentrator, quality of a communication link for a section between the master communication modem and the repeater, a section between the repeater and the slave communication modem, or a section between the slave communication modem and the electronic meter is analyzed, and the transmitting is performed according to a store-and-forward manner-based meter reading process based on the analyzed quality of the communication link for the section.

* * * * *